C. SCHNOOR.
Horseshoeing Apparatus.

No. 158,529.  Patented Jan. 5, 1875.

Witnesses.  Inventor.

UNITED STATES PATENT OFFICE.

CHARLES SCHNOOR, OF DAVENPORT, IOWA.

IMPROVEMENT IN HORSESHOEING APPARATUS.

Specification forming part of Letters Patent No. 158,529, dated January 5, 1875; application filed October 30, 1874.

*To all whom it may concern:*

Be it known that I, CHARLES SCHNOOR, of Davenport, in the county of Scott and State of Iowa, have invented a new and useful Improvement in Knee-Supports for Blacksmiths' Use in Shoeing Horses; and I do hereby declare that the following is a specification of the same.

Figure 1:
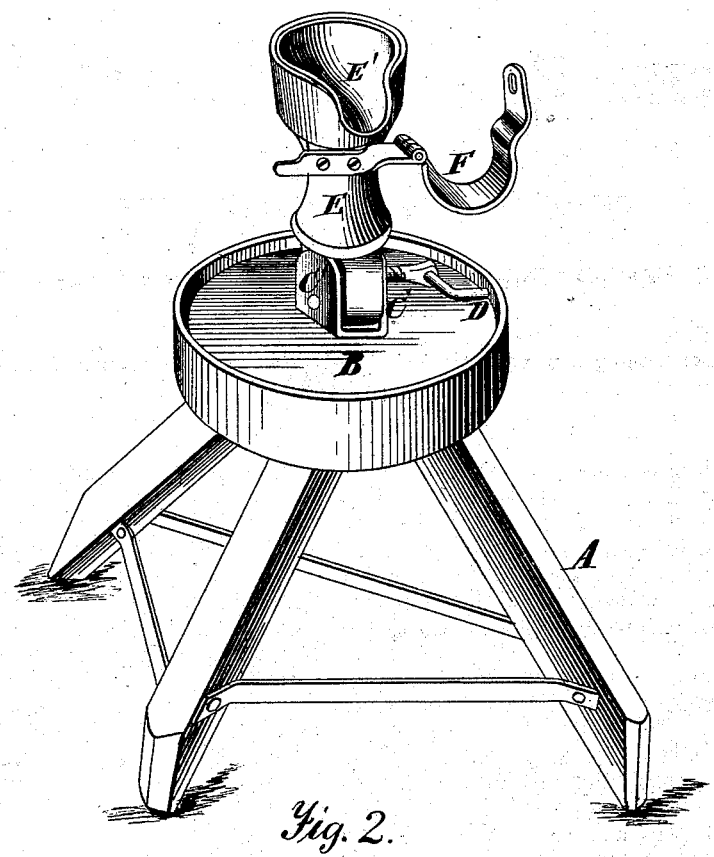
Figure 2:
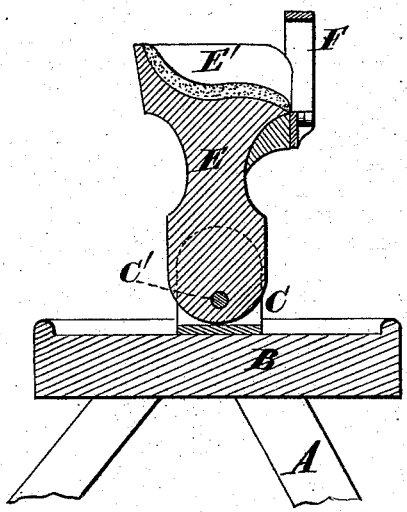

In the annexed drawings, which make a part of this specification, Figure 1 is a perspective view. Fig. 2 is a vertical section.

The same letters are employed in all the figures in the designation of identical parts.

The apparatus is supported on a tripod or other legs, A, attached to a table, B, which serves as a convenient place for the nails, shoes, hammers, and other tools which the smith may desire to use in his work while shoeing the horse. Lugs C are fastened securely on the table, and support the standard E, which is attached thereto by a pivot, which permits the supporting-standard to be turned freely, so as to accommodate itself to the position of the horse's leg, when it is fastened by turning the set-screw D. In the top of the standard is a cup, E', of proper form to receive the horse's knee and hold it comfortably. The inner surface of the cup may be covered with a padding of leather, to make it easier. The cup is cut away on one side to fit the shank of the fore leg, and immediately below this a hinged strap, F, is attached. This strap, when the horse's knee is in the cup and properly adjusted, is turned over the shank and fastened by a spring-catch, so as to rigidly confine the leg while the smith is at work.

I am aware that the support for the hind leg, operated and adjusted substantially in the manner described by me, is not new, such device being shown in the patent of J. Shimer, March 12, 1872, No. 124,452, and which I disclaim.

What I claim as my invention, and desire to secure by Letters Patent, is—

The adjustable knee-support E, constructed and arranged to operate substantially as shown and described.

In testimony whereof I have signed my name to this specification in the presence of two subscribing witnesses.

CHARLES SCHNOOR.

Witnesses:
ANDREAS T. CARSTENS,
FRITZ SCHEMMEL.